(12) United States Patent
Mumick

(10) Patent No.: US 10,999,420 B2
(45) Date of Patent: May 4, 2021

(54) ADAPTIVE COMMUNICATION MODE FOR RECORDING A MEDIA MESSAGE

(71) Applicant: SRK Technology LLC, Wilmington, DE (US)

(72) Inventor: Kieraj Singh Mumick, Berkeley Heights, NJ (US)

(73) Assignee: SRK TECHNOLOGY LLC, Wilmington, DE (US)

(*) Notice: Subject to any disclaimer, the term of this patent is extended or adjusted under 35 U.S.C. 154(b) by 0 days.

(21) Appl. No.: 16/816,274

(22) Filed: Mar. 12, 2020

(65) Prior Publication Data

US 2020/0213436 A1 Jul. 2, 2020

Related U.S. Application Data

(63) Continuation of application No. 16/556,271, filed on Aug. 30, 2019, now Pat. No. 10,623,547, which is a
(Continued)

(51) Int. Cl.
*H04M 1/65* (2006.01)
*H04M 1/725* (2021.01)
(Continued)

(52) U.S. Cl.
CPC ............ *H04M 1/65* (2013.01); *G06F 3/0219* (2013.01); *G06F 3/0484* (2013.01);
(Continued)

(58) Field of Classification Search
CPC .. H04M 1/65; H04M 1/72522; H04M 1/7255; H04M 2250/22; G06F 3/0484; G06F 3/0219; H04W 4/10
See application file for complete search history.

(56) References Cited

U.S. PATENT DOCUMENTS

| 4,951,079 A | 8/1990 | Hoshino et al. |
| 6,948,136 B2* | 9/2005 | Trewin ............. G06F 3/033 715/865 |

(Continued)

FOREIGN PATENT DOCUMENTS

JP 3888584 B2 12/2006

OTHER PUBLICATIONS

Preston Gralla, Galaxy Tab: The Missing Manual, O'Reilly, Sep. 2011, 11 pages.
(Continued)

*Primary Examiner* — Ankur Jain
(74) *Attorney, Agent, or Firm* — Ashok Tankha; Lipton Weinberger & Husick

(57) ABSTRACT

A computer implemented method and system for determining a communication mode for recording a media message on a communication device is provided. An adaptive recording application detects activation of an interface element, for example, a push or a touch of a button on the communication device and determines duration of the activation of the interface element. The adaptive recording application, in response to the detection of the activation of the interface element, selects a communication mode, for example, a push to talk communication mode, a tap to start communication mode, etc., based on a comparison of the duration of the activation of the interface element with one or more configurable timing parameters and/or a determination of a presence or an absence of a media signal during and/or after the activation of the interface element. The adaptive recording application initiates recording of the media message in the selected communication mode.

8 Claims, 11 Drawing Sheets

Related U.S. Application Data continuation of application No. 15/892,379, filed on Feb. 8, 2018, now Pat. No. 10,447,836, which is a continuation of application No. 14/608,193, filed on Jan. 29, 2015, now Pat. No. 9,930,159, which is a continuation of application No. 13/945,278, filed on Jul. 18, 2013, now Pat. No. 8,996,059.

(60) Provisional application No. 61/673,728, filed on Jul. 19, 2012.

(51) Int. Cl.
*G06F 3/02* (2006.01)
*G06F 3/0484* (2013.01)
*H04W 4/10* (2009.01)

(52) U.S. Cl.
CPC ..... *H04M 1/7255* (2013.01); *H04M 1/72522* (2013.01); *H04W 4/10* (2013.01); *H04M 2250/22* (2013.01)

(56) References Cited

U.S. PATENT DOCUMENTS

| | | | |
|---|---|---|---|
| 7,095,442 B2 | 8/2006 | van Zee | |
| 7,721,227 B2* | 5/2010 | Ronkainen | H04M 1/72519 715/822 |
| 7,769,827 B2 | 8/2010 | Girouard et al. | |
| 7,933,508 B2 | 4/2011 | Konicek | |
| 8,203,640 B2 | 6/2012 | Kim et al. | |
| 9,031,847 B2 | 5/2015 | Sarin et al. | |
| 9,063,629 B2* | 6/2015 | Newman | G06F 3/048 |
| 9,182,935 B2 | 11/2015 | Sirpal et al. | |
| 9,462,107 B2* | 10/2016 | Rhoads | H04W 4/02 |
| 2002/0106199 A1 | 8/2002 | Ikeda | |
| 2004/0037395 A1* | 2/2004 | Itoh | H04M 1/2471 379/67.1 |
| 2004/0183895 A1 | 9/2004 | Kikuchi | |
| 2005/0093988 A1 | 5/2005 | Haas et al. | |
| 2005/0159948 A1 | 7/2005 | Roth et al. | |
| 2005/0203998 A1 | 9/2005 | Kinnumen et al. | |
| 2006/0217105 A1* | 9/2006 | Kumar P S | H04M 1/72541 455/404.1 |
| 2007/0178934 A1* | 8/2007 | Sun | H04M 1/656 455/550.1 |
| 2008/0039052 A1* | 2/2008 | Knowles | H04L 51/38 455/412.1 |
| 2010/0248778 A1* | 9/2010 | Biswas | H04M 1/0218 455/556.1 |
| 2010/0251164 A1* | 9/2010 | Karan | H04M 1/72544 715/782 |
| 2012/0019704 A1 | 1/2012 | Levey | |
| 2012/0315880 A1* | 12/2012 | Peitrow | H04M 1/642 455/412.1 |
| 2013/0110565 A1* | 5/2013 | Means, Jr. | G06Q 10/06 705/7.11 |
| 2013/0111377 A1* | 5/2013 | Newman | G06F 3/048 715/764 |
| 2013/0286250 A1 | 10/2013 | Kumar | |
| 2014/0024324 A1* | 1/2014 | Mumick | H04M 1/7255 455/90.1 |
| 2014/0223347 A1* | 8/2014 | Seo | G06F 3/0486 715/769 |
| 2015/0193098 A1 | 7/2015 | Kauffmann et al. | |

OTHER PUBLICATIONS

Guy Hart-Davis, How to do everything: Samsung Galaxy Tab, Mc Graw Hill, 6 pages.
Mark K. Bilbo, Que's Mac Classic Book, 6 pages.
Samsung Galaxy Tab 10.1 : Android Tablet User Manual, 66 pages.
Fred Davis, The Windows 95 Bible, 12 pages.

* cited by examiner

ADAPTIVE COMMUNICATION MODE FOR RECORDING A MEDIA MESSAGE

CROSS REFERENCE TO RELATED APPLICATIONS

This is a continuation application of non-provisional patent application Ser. No. 16/556,271 titled "Adaptive Communication Mode For Recording A Media Message", filed in the United States Patent and Trademark Office on Aug. 30, 2019, which is a continuation application of non-provisional patent application Ser. No. 15/892,379 titled "Adaptive Communication Mode For Recording A Media Message", filed in the United States Patent and Trademark Office on Feb. 8, 2018, which is a continuation application of non-provisional patent application Ser. No. 14/608,193 titled "Adaptive Communication Mode For Recording A Media Message", filed in the United States Patent and Trademark Office on Jan. 29, 2015, which is a continuation application of non-provisional patent application Ser. No. 13/945,278 titled "Adaptive Communication Mode For Recording A Media Message", filed in the United States Patent and Trademark Office on Jul. 18, 2013, which claims the benefit of provisional patent application No. 61/673,728 titled "Adaptive Communication Mode For Recording An Audio Message", filed in the United States Patent and Trademark Office on Jul. 19, 2012.

The specifications of the above referenced patent applications are incorporated herein by reference in their entirety.

BACKGROUND

Prior to the age of smart phones and mobile tablets, the need for recording an audio message, a video message, or any other media message while on the move was not high. One method to record an audio message was to make a phone call, speak on the phone, and record a user's voice on the other end of the line, for example, when using answering machines and voicemails, or when speaking on a recorded line. However, as technology developed and smart phones became popular, many smart phone applications came up with the need to record audio messages and other media messages. For example, two communication modes for recording audio were developed, that is, a push to talk (PTT) communication mode and a tap to start (TTS) communication mode.

In the push to talk communication mode, a user pushes a button on the user's communication device, and keeps the button pressed. The user records his or her message while the button is pushed down. Upon release of the button, the communication device terminates recording and saves the message. This method provides the user with one click access to recording a short media message. The other communication mode, that is, the tap to start communication mode, requires a user to first click a start button or an initiation button on the communication device to start the recording process. In this case, the user clicks, that is, taps and quickly releases the button, at which time the communication device initiates recording of the media message. The user then has to click a stop button on the communication device to stop the recording. After clicking the stop button, the communication device terminates the recording and saves the recorded media message. There is also a variation of the tap to start communication mode, where a user is not required to click the stop button on the communication device. Instead, the communication device performs voice activity detection to determine when the user has stopped speaking, and at this time the communication device automatically terminates the recording and saves the audio message.

The push to talk communication mode allows a user to record a short audio message quickly, with a single press of a button on the communication device; that is, all the user is required to do is press the button and then release the button. However, in the push to talk communication mode, the user finds it difficult to record a long audio message. The user is forced to interact with the communication device throughout the recording of the audio message, which makes the process for recording long audio messages inconvenient. While recording a long audio message, the user's finger may inadvertently slip off the "push to talk" button on the communication device, which would indicate to the communication device that the user wants to terminate the recording, thereby causing the communication device to abruptly terminate the recording of the audio message even though the user intended to continue recording the audio message. It is also not feasible for a user, while pressing a button to place a smart phone at his/her ear to speak, forcing him/her to use a speakerphone.

The tap to start communication mode can be convenient for recording long audio messages. The tap to start communication mode allows the user to tap a button on the communication device, and have both his/her hands free while recording an audio message, for example, a one minute audio message, a song being heard at a concert, etc. The tap to start communication mode allows a user to have minimal or no friction while recording a long audio message. That is, tapping a single button on the communication device to initiate the recording and then tapping a button again only to terminate the recording allows the user to not have to interact with the communication device while recording the audio message. However, in the tap to start communication mode, it is inconvenient to record short audio messages. Since the tap to start communication mode requires the use of two user interactions, it is difficult for the user to record a short audio message. A short audio message, for example, "Hi!" would require the user to first tap the "tap to start" button on the communication device to initiate recording, then speak "Hi!", and then immediately tap the same button again or a different button to terminate the recording.

In some solutions, options are provided in a "Settings" menu to allow a user to select which communication mode he or she would prefer using for recording a media message. However, the user would still have the inconvenience of frequently switching between these options. Consider an example where a user is in the middle of a lengthy back and forth conversation with one of his/her friends, and is simultaneously asking a few other friends if they are available to go to the movies. In order to evade the problems created by the tap to start communication mode and the push to talk communication mode, the user would have to continuously interrupt recording of audio messages by navigating to the "Settings" menu on the user's communication device and switching the communication mode to the communication mode the user would like to use for the next interaction.

Hence, there is a long felt but unresolved need for a computer implemented method and system that determines a communication mode for recording a media message, for example, an audio message, a video message, an audiovisual message, a multimedia message, etc., on a user' communication device, by automatically deducing the user's intent while recording the media message.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated need for determining a communication mode for recording a media message on a user' communication device, by automatically deducing the user's intent while recording the media message. As used herein, the term "media message" refers to a message that can be recorded on a user's communication device, for example, a cellular phone, a smart phone, a tablet computing device, a personal digital assistant, a laptop, a touch centric device, etc., or any other mobile device configured for mobile communication. The media message is, for example, an audio message, a video message, an audiovisual message, a multimedia message, etc., and any combination thereof. Also, as used herein, the term "communication mode" refers to a mode for initiating and terminating recording of a media message on a communication device. The communication mode can be, for example, a push to talk (PTT) communication mode or a tap to start (TTS) communication mode. The computer implemented method and system disclosed herein provides an adaptive recording application executable by at least one processor configured to record the media message on the user's communication device.

The adaptive recording application detects activation of an interface element on the communication device for initiating the recording of the media message. As used herein, the term "interface element" refers to any software or hardware implemented switch or button, for example, a physical push button, a touch button or a tactile button, a screen icon type touch button, a wheel, a touch pad, etc., capable of receiving an input from a user or capturing an application of pressure from the user. The adaptive recording application determines a duration of the activation of the interface element. As used herein, the term "duration of activation" refers to a measure of time during which the user presses and holds the interface element. That is, the duration of activation is the measure of the length of time of a user's click on an interface element. The adaptive recording application compares the duration of the activation of the interface element with one or more configurable timing parameters. As used herein, the term "configurable timing parameters" refers to time parameters used by the adaptive recording application for comparison with the duration of activation of an interface element to enable the adaptive recording application to select one of the communication modes for recording the media message. In an embodiment, the adaptive recording application configures the configurable timing parameters, for example, based on a user input or a system setting configured by the adaptive recording application, or through an analysis of the duration of the activation of the interface element, and/or the behavior of the user determined from the activation of the interface element by the user in the past, or during a training session. The adaptive recording application selects, in response to the detection of the activation of the interface element, one of the communication modes, for example, the push to talk communication mode or the tap to start communication mode for recording the media message based on the comparison of the duration of the activation of the interface element with one or more configurable timing parameters.

In an embodiment, the configurable timing parameters comprise a critical time. As used herein, the term "critical time" refers to a time configured, for example, by a user input, a system setting, etc. In this embodiment, the adaptive recording application compares duration of the activation of the interface element with the critical time. The adaptive recording application selects, in response to the detection of the activation of the interface element, one of the communication modes based on the comparison of the duration of the activation of the interface element with the critical time. For example, if the duration of the activation of the interface element exceeds the critical time, the adaptive recording application selects the push to talk communication mode for recording the media message, and if the duration of the activation of the interface element is less than the critical time, the adaptive recording application selects the tap to start communication mode for recording the media message. The adaptive recording application triggers recording of the media message on the communication device using the selected communication mode.

In an embodiment, the computer implemented method and system disclosed herein determines a communication mode for recording a media message on a user's communication device on determining a presence or an absence of a media signal during and/or after the activation of the interface element. As used herein, the term "media signal" refers to a signal comprising media, for example, audio, video, etc., that can be detected by the adaptive recording application to enable the adaptive recording application to select a communication mode for recording a media message. The media signal is, for example, an audio signal, a video signal, an audiovisual signal, a multimedia signal, etc. In this embodiment, on detection of the activation of the interface element on the communication device, the adaptive recording application determines a presence or an absence of a media signal during and/or after the activation of the interface element. For example, the adaptive recording application determines a presence of an audio signal by listening to an utterance of a user or other audible sounds such as music, natural sounds such as birds chirping, etc., during the activation of the interface element, or after the activation of the interface element, or during and after the activation of the interface element. In another example, the adaptive recording application determines an absence of an audio signal by listening for a lack of an utterance, that is, silence of the user and a lack of other audible sounds such as music, natural sounds such as birds chirping, etc., during the activation of the interface element, or after the activation of the interface element, or during and after the activation of the interface element. The adaptive recording application selects, in response to the detection of the activation of the interface element, one of the communication modes for recording the media message based on the determination of the presence or the absence of the media signal. The adaptive recording application then triggers recording of the media message on the communication device using the selected communication mode. In an embodiment, the adaptive recording application analyzes the media signal received during and/or after the activation of the interface element for selecting one of the communication modes. In an embodiment, the adaptive recording application initiates the recording of the media message prior to the selection of one of the communication modes. In another embodiment, the adaptive recording application initiates the recording of the media message after the selection of one of the communication modes.

In another embodiment, the computer implemented method and system disclosed herein determines a communication mode for recording a media message on a communication device based on a combination of the comparison of the duration of the activation of the interface element with one or more configurable timing parameters and the determination of a presence or an absence of a media signal during and/or after the activation of the interface element. In this embodiment, the adaptive recording application selects, in response to the detection of the activation of the interface element, one of the communication modes for recording the media message based on the combination.

In another embodiment, the configurable timing parameters comprise a lower threshold time and an upper threshold time. As used herein, the term "lower threshold time" refers to a time before which it is explicitly clear that the user's intention is to use the tap to start communication mode based on the fact that the interface element is held down for a short time. Also, as used herein, the term "upper threshold time" refers to a time after which it is explicitly clear that the user intends to use the push to talk communication mode based the fact that the user is holding the interface element down for a long time. In this embodiment, the adaptive recording application compares the duration of the activation of the interface element with the lower threshold time and the upper threshold time. The adaptive recording application selects, in response to the detection of the activation of the interface element, one of the communication modes based on the comparison of the duration of the activation of the interface element with the lower threshold time and the upper threshold time. For example, if the duration of the activation of the interface element is less than the lower threshold time, the adaptive recording application selects the tap to start communication mode for recording a media message, and if the duration of the activation of the interface element is greater than the upper threshold time, the adaptive recording application selects the push to talk communication mode for recording the media message.

In an embodiment, if the duration of the activation of the interface element is greater than the lower threshold time and less than the upper threshold time, the adaptive recording application selects one of the communication modes based on one or more of multiple options comprising, for example, a presence or an absence of a media signal, proximity of the duration of the activation of the interface element to the lower threshold time or the upper threshold time, type of the user's communication device, a user input clarifying the communication mode intended by the user, etc.

The computer implemented method and system disclosed herein detects the user's intent while the user clicks on an interface element on the user's communication device to record a media message. Since the adaptive recording application can detect what the user is intending to do, and can adapt to the user's needs, the computer implemented method and system disclosed herein provides the user with a friction-free method for recording a media message in a communication mode that is convenient and natural for the interaction the user has in mind, without the need to manually switch between the communication modes.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1A:
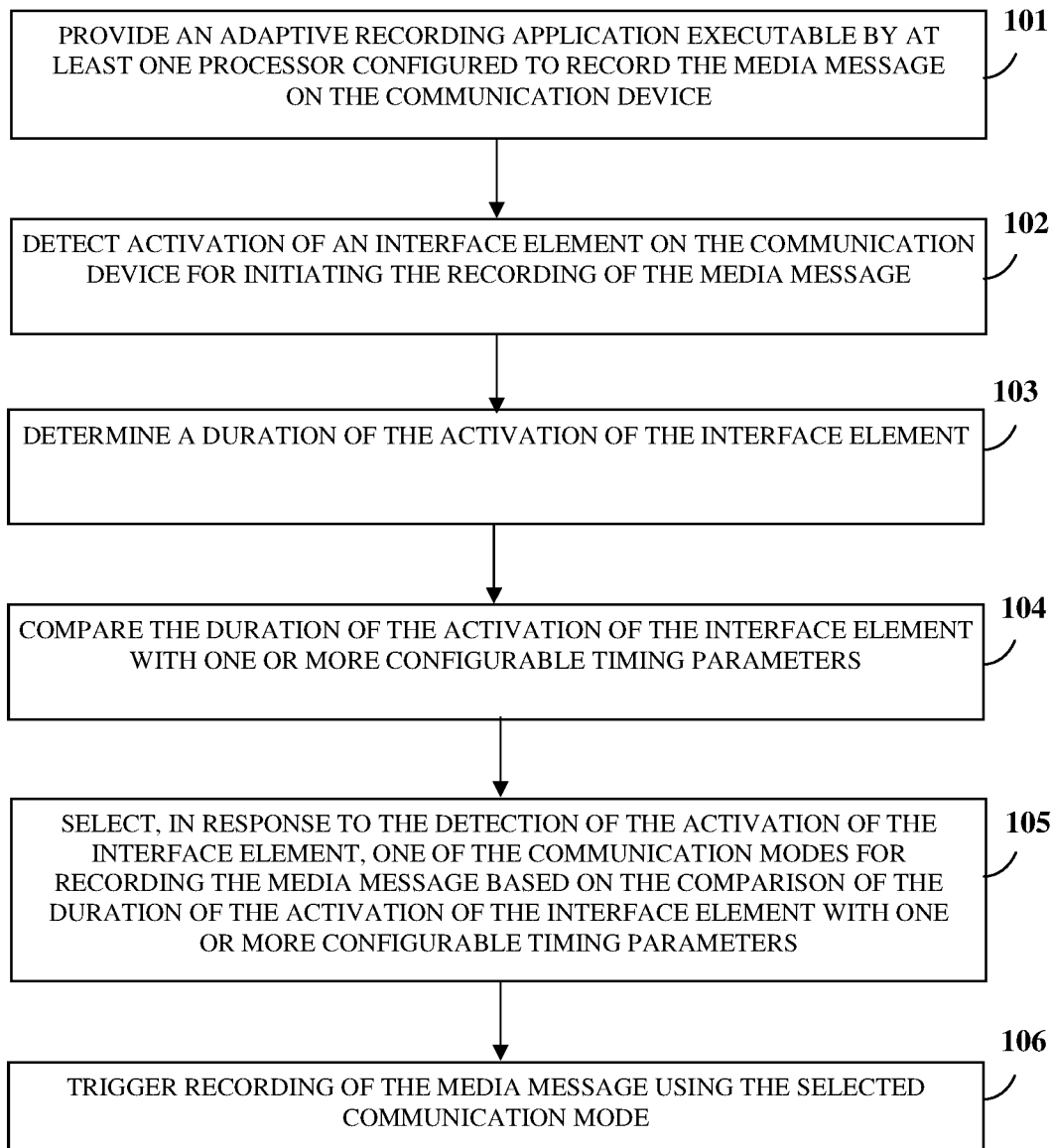
FIG. 1A exemplarily illustrates a computer implemented method for determining a communication mode for recording a media message on a communication device.

FIG. 1A exemplarily illustrates a computer implemented method for determining a communication mode for recording a media message on a communication device. As used herein, the term "media message" refers to a message that can be recorded on a user's communication device, for example, a cellular phone, a smart phone, a tablet computing device, an Ultrabook®, a laptop, a personal digital assistant, a touch centric device, etc., or any other mobile device configured for mobile communication. The media message is, for example, an audio message, a video message, an audiovisual message, a multimedia message, etc., and any combination thereof. Also, as used herein, the term "communication mode" refers to a mode for initiating and terminating recording of a media message on a communication device. The communication mode can be, for example, a push to talk (PTT) communication mode, a tap to start (TTS) communication mode, etc. The communication device may be used for transmitting the recorded media message to another communication device via a network, for example, a mobile communication network. In the push to talk communication mode, a user is expected to engage an interface element for the entire duration of recording of a media message. That is, the recording initiates as soon as the user activates the interface element and terminates only when the user releases the interface element. As used herein, the term "interface element" refers to any software or hardware implemented switch or button, for example, a physical push button, a touch button or a tactile button, a screen icon type touch button, a wheel, a touch pad, etc., capable of receiving an input from a user or capturing an application of pressure from the user. In the tap to start communication mode, the user is expected to activate the interface element for a short time, which initiates the recording of a media message, then to release the interface element, then speak, and then activate the interface element a second time to terminate the recording of the media message.

The computer implemented method disclosed herein provides 101 an adaptive recording application executable by at least one processor configured to record the media message on the communication device. The adaptive recording application detects 102 activation of an interface element on the user's communication device for initiating the recording of the media message. For example, the adaptive recording application detects a click, a touch, a press, a push, a tap, etc., of a screen icon type touch button or a physical push button on the communication device by the user for initiating recording of the media message. After the interface element is activated, the adaptive recording application selects the communication mode and initiates recording of the media message of the user in the selected communication mode. The method for determining the communication mode for recording the media message is independent of the type of the interface element being activated.

The adaptive recording application determines 103 a duration of the activation of the interface element. As used herein, the term "duration of activation" refers to a measure of time during which the user presses and holds the interface element. For example, the adaptive recording application measures the length of time of a user's click on an interface element, or the time for which the interface element is pressed. The adaptive recording application compares 104 the duration of the activation of the interface element with one or more configurable timing parameters. As used herein, the term "configurable timing parameters" refers to time parameters used by the adaptive recording application for comparison with the duration of activation of an interface element to enable the adaptive recording application to select one of the communication modes for recording the media message. In an embodiment, the adaptive recording application configures the configurable timing parameters, for example, based on a user input or a system setting configured by the adaptive recording application, or through an analysis of the duration of the activation of the interface element by the user in the past, and/or the behavior of the user determined from the activation of the interface element by the user in the past, and/or during user training as disclosed in the detailed description of FIGS. 5-6. That is, the configurable timing parameters can be fixed as a system settable parameter, as a user settable parameter, or may vary and be calculated based on one or more of a number of factors, for example, type of the communication device, characteristics of the user, user actions, past user interactions, language, etc. In an embodiment, the configurable timing parameters comprise a critical time. In another embodiment, the configurable timing parameters comprise a lower threshold time, an upper threshold time, etc. The adaptive recording application can also learn and change the configurable timing parameters based on the user's behavior with the adaptive recording application.

The adaptive recording application selects 105, in response to the detection of the activation of the interface element, one of the communication modes for recording the media message based on the comparison of the duration of the activation of the interface element with one or more configurable timing parameters. The adaptive recording application selects, for example, the tap to start communication mode if the duration of the activation of the interface element is less than the critical time. The adaptive recording application selects the push to talk communication mode if the duration of the activation of the interface element is greater than the critical time. The adaptive recording application triggers 106 the recording of the media message in the selected communication mode. Once the communication mode is selected by the adaptive recording application, the recording of the media message continues using the selected communication mode.

Figure 1B:
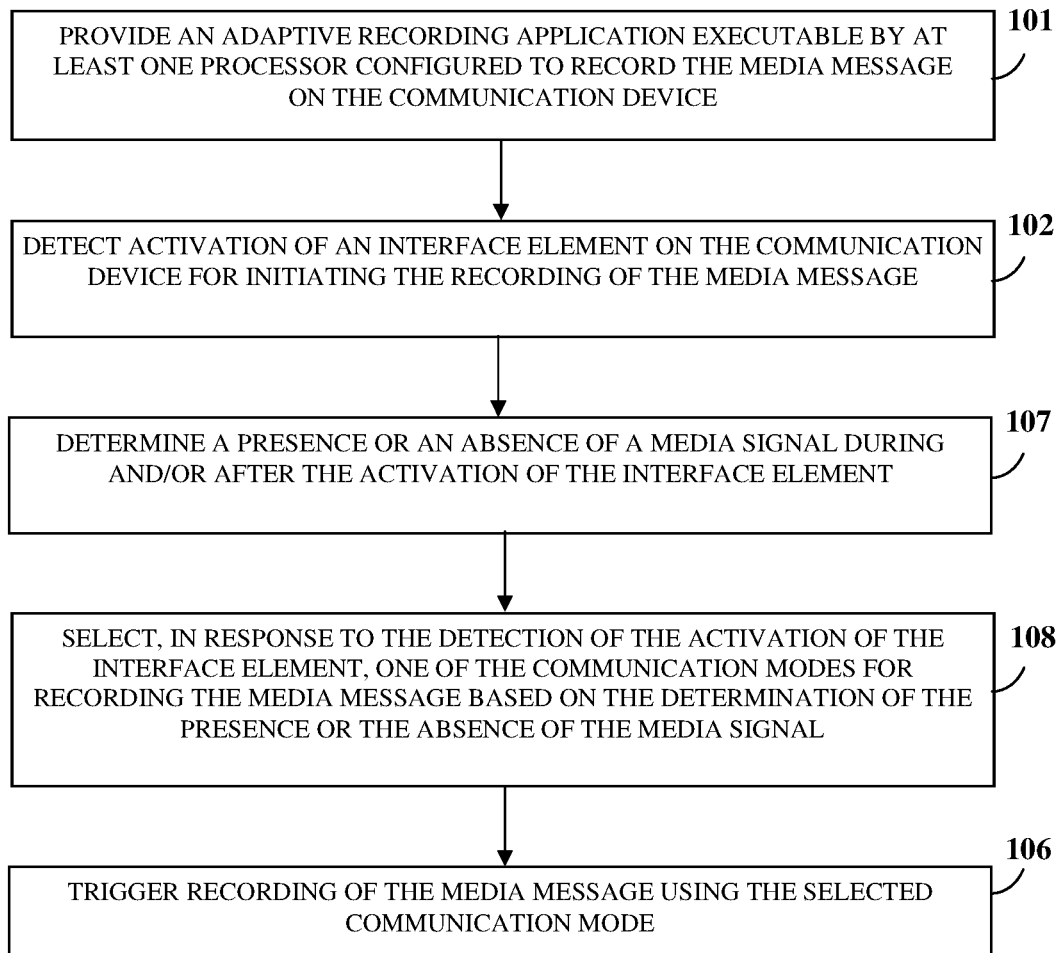
FIG. 1B exemplarily illustrates an embodiment of the computer implemented method for determining a communication mode for recording a media message on a communication device.

FIG. 1B exemplarily illustrates an embodiment of the computer implemented method for determining a communication mode for recording a media message on a communication device. The computer implemented method disclosed herein provides 101 the adaptive recording application as disclosed in the detailed description of FIG. 1A. The adaptive recording application enables recording of the media message using the communication mode intended by the user and determined by the adaptive recording application. The adaptive recording application detects 102 activation of an interface element on the user's communication device for initiating the recording of the media message.

In this embodiment, on detection of the activation of the interface element, the adaptive recording application determines 107 a presence or an absence of a media signal during and/or after the activation of the interface element. As used herein, the term "media signal" refers to a signal comprising media, for example, audio, video, etc., that can be detected by the adaptive recording application to enable the adaptive recording application to select a communication mode for recording a media message. The media signal is, for example, an audio signal, a video signal, an audiovisual signal, a multimedia signal, etc. The media signals comprise, for example, voice signals received from the user when the user speaks into a microphone of the communication device and audible sounds such as music, natural sounds such as birds chirping, etc., that are heard for recording an audio message. The adaptive recording application, while detecting an activation of the interface element, determines a presence or an absence of a media signal. For example, the adaptive recording application, while detecting a click of a button on the communication device, determines a presence of an audio signal by listening to an utterance of the user, or to other audible sounds. In another example, the adaptive recording application, while detecting the click of a button on the communication device, determines an absence of an audio signal by listening for a lack of an utterance, that is, silence of the user, lack of audible sounds such as music, lack of natural sounds such as birds chirping, etc., that the user intends to record. The adaptive recording application, after detecting an activation of the interface element, determines a presence or an absence of a media signal. Also, for example, the adaptive recording application, after detecting the click of a button on the communication device, determines a presence of an audio signal by listening to an utterance of the user, other audible sounds, etc. In another example, the adaptive recording application, after detecting the click of a button on the communication device, determines an absence of an audio signal by listening for a lack of an utterance, that is, silence of the user, a lack of audible sounds such as music, a lack of natural sounds such as birds chirping, etc., that the user intends to record. The adaptive recording application performs the processing and the detection of the media signal using hardware and/or software. In an embodiment, the adaptive recording application determines a presence or an absence of a media signal during and after the activation of the interface element. In another embodiment, the adaptive recording application determines a presence or an absence of a media signal during and/or after deactivation of the interface element. For example, the adaptive recording application determines the presence or the absence of the audio signal during and/or after the release of a button on the communication device.

The adaptive recording application selects 108, in response to the detection of the activation of the interface element, one of the communication modes for recording the media message based on the determination 107 of the presence or the absence of the media signal. The adaptive recording application deduces the intent of the user by a combination of the activation of the interface element and the presence or the absence of an utterance of audio by the user, other audible sounds, etc. If the activation of the interface element occurs along with the determination of a presence of a media signal concurrently or soon thereafter, then the adaptive recording application may select the push to talk communication mode. If the activation of the user interface element occurs without a subsequent determination of a presence of a media signal, then the adaptive recording application may select the tap to start communication mode. In another example, if the activation of the interface element occurs along with the subsequent determination of an absence of a media signal, then the adaptive recording application may select the tap to start communication mode.

In an embodiment, the adaptive recording application analyzes the media signal received during and/or after the activation of the interface element for selecting one of the communication modes. During the analysis of the media signal, the adaptive recording application distinguishes between multiple sounds, for example, voice signals, audible sounds such as music, natural sounds such as birds chirping, etc., contained in the media signal. For example, if an audio signal contains noise or background chatter, the adaptive recording application, for the purpose of determining the communication mode and the user's intent to record the audio signal without noise or background chatter, eliminates the noise or background chatter with assistance from noise cancellation algorithms that are well known in the art. Noise cancellation may be used to remove background noise to better analyze the audio signal. In another example, if the audio signal contains noise or background chatter, the adaptive recording application, for purpose of determining the communication mode and the user's intent to record the audio signal along with noise or background chatter, does not eliminate the noise or background chatter.

Although the detailed description refers to presence or absence determination and analysis of an audio signal, the scope of the computer implemented method and system disclosed herein is not limited to presence or absence determination and analysis of an audio signal but may be extended to include presence or absence determination and analysis of any media signal, for example, a video signal, an audiovisual signal, a multimedia signal, etc.

The adaptive recording application triggers 106 the recording of the media message using the selected communication mode. Once the communication mode is selected by the adaptive recording application, the recording of the media message continues in the selected communication mode. The analysis of the media signal by the adaptive recording application also determines whether the recording of the media message has ended. If the recording of the media message has ended, the adaptive recording application automatically terminates the recording of the media message. In an embodiment, the adaptive recording application initiates recording of the media message prior to the selection of the communication mode. For example, the recording of an audio message starts before the selection of the push to talk communication mode or the tap to start communication mode. In another embodiment, the adaptive recording application initiates recording of the media message after the selection of the communication mode. For example, the recording of an audio message starts after the selection of the push to talk communication mode or the tap to start communication mode. The method for terminating the recording is based on the selection of the communication mode. For example, in the push to talk communication mode, the user presses an initiation button on a communication device and holds the initiation button for recording the audio message. The user releases the initiation button after recording the audio message. The adaptive recording application terminates the recording of the audio message on detecting the release of the initiation button. In another example, in the tap to start communication mode, the user taps or presses an initiation button and releases the initiation button to start recording of the audio message. The user records the audio message and taps on the initiation button again or taps a different button after completion of recording of the audio message. In this example, the adaptive recording application terminates the recording of the audio message on detecting the second tap on the initiation button.

Figure 1C:
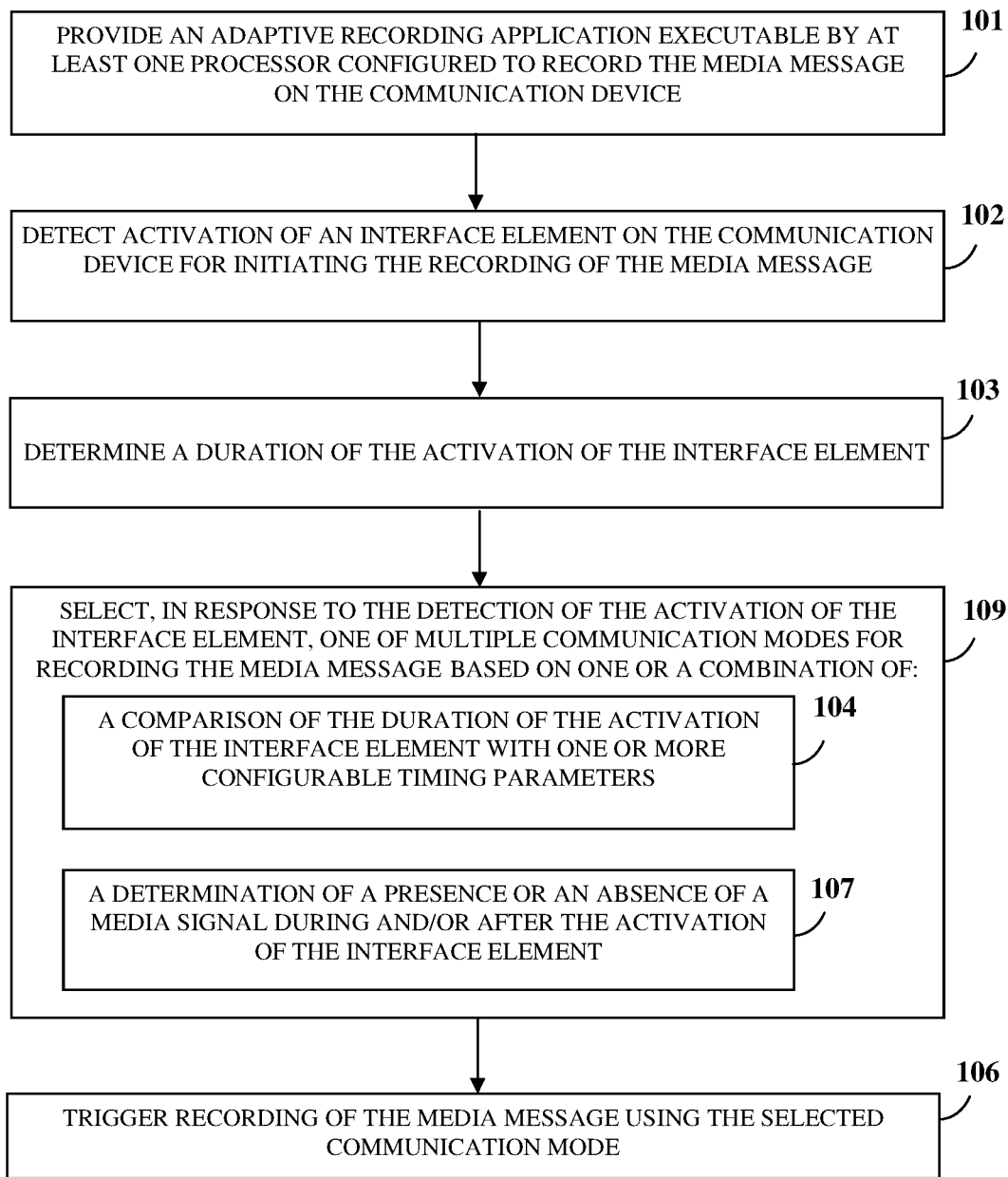
FIG. 1C exemplarily illustrates another embodiment of the computer implemented method for determining a communication mode for recording a media message on a communication device.

FIG. 1C exemplarily illustrates another embodiment of the computer implemented method for determining a communication mode for recording a media message on a communication device. The computer implemented method disclosed herein provides 101 the adaptive recording application as disclosed in the detailed description of FIG. 1A. The adaptive recording application detects 102 activation of an interface element on the user's communication device for initiating the recording of the media message as disclosed in the detailed description of FIG. 1A. The adaptive recording application determines 103 a duration of the activation of the interface element as disclosed in the detailed description of FIG. 1A. In this embodiment, the adaptive recording application selects 109, in response to the detection of the activation of the interface element, one of the communication modes for recording the media message based on a combination of the comparison 104 of the duration of the activation of the interface element with one or more configurable time parameters as disclosed in the detailed description of FIG. 1A, and the determination 107 of a presence or an absence of a media signal during and/or after the activation of the interface element as disclosed in the detailed description of FIG. 1B. The adaptive recording application determines the presence or the absence of a media signal during the activation of the interface element, or after the activation of the interface element, or during and after the activation of the interface element. The adaptive recording application triggers 106 the recording of the media message using the selected communication mode. Once the communication mode is selected by the adaptive recording application, the recording of the media message continues in the selected communication mode.

For purposes of illustration, the detailed description refers to recording of an audio message; however the scope of the computer implemented method and system disclosed herein is not limited to recording of an audio message but may be extended to include recording of a video message or a video clip, an audiovisual message, a multimedia message, etc., or any combination thereof.

Figure 2:
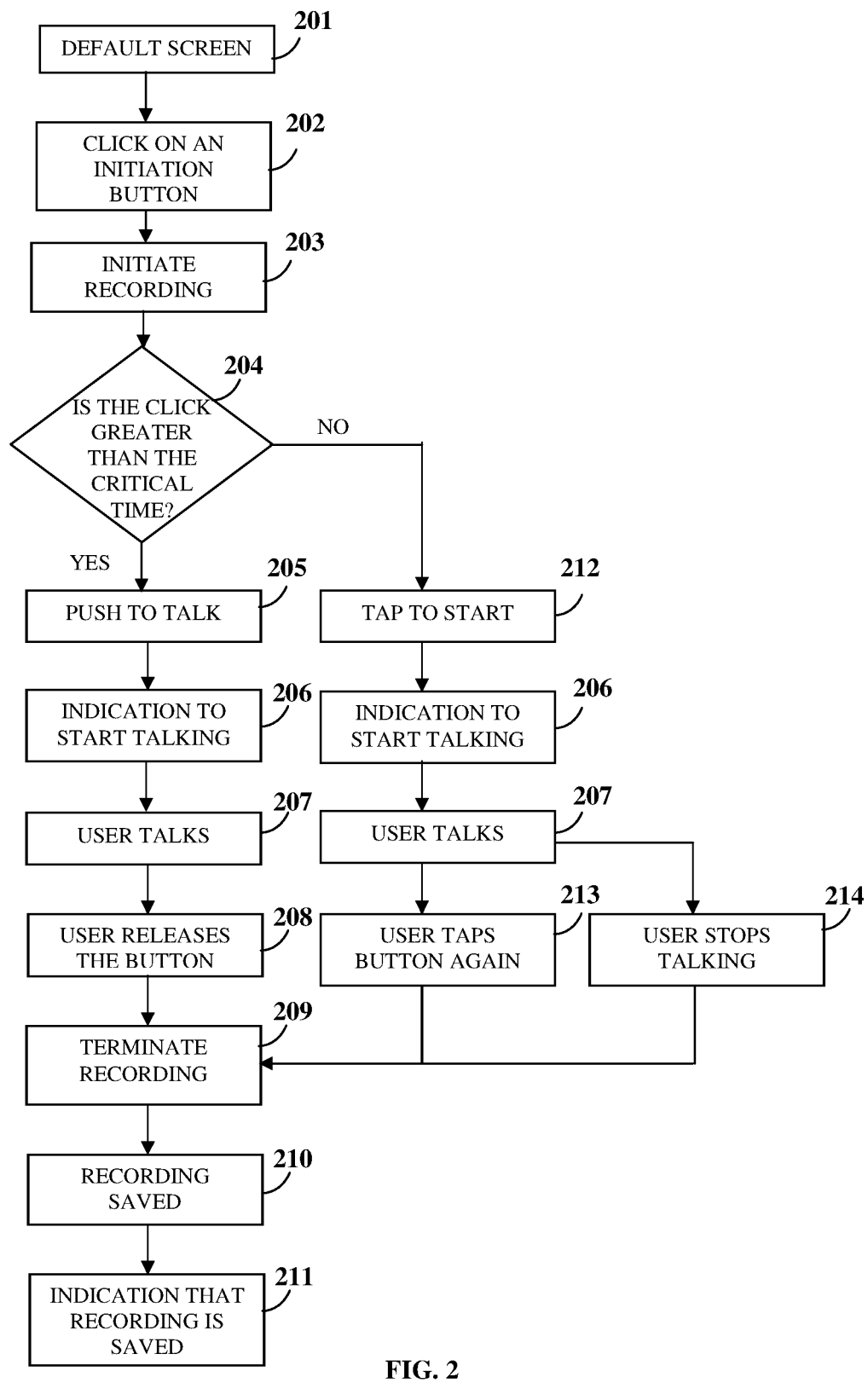
FIG. 2 exemplarily illustrates a flowchart comprising the steps for determining a communication mode for recording an audio message on a communication device based on a comparison of a duration of an activation of an interface element with a critical time.

FIG. 2 exemplarily illustrates a flowchart comprising the steps for determining a communication mode for recording an audio message on a communication device based on a comparison of a duration of an activation of an interface element with a critical time. In this embodiment, the configurable timing parameter is the critical time. The critical time can be fixed as a system settable parameter, as a user settable parameter, or may vary and be calculated based on one or more of a number of factors, for example, type of the communication device, characteristics of the user, user actions, past user interactions, language, etc. The adaptive recording application can also learn and change the critical time based on the user's behavior with the adaptive recording application. In an example, the adaptive recording application starts with a critical time of 0.3 seconds, but determines that the user often keeps the interface element on the communication device pressed for about 0.5 seconds before releasing the interface element, and then starts speaking; indicating that a critical time of 0.5 seconds may be more suitable for the user. The adaptive recording application therefore learns and changes the critical time to 0.5 seconds for that particular user. In another example, the critical time may be longer in a slower communication device as compared to a newer and faster communication device.

As exemplarily illustrated in FIG. 2, the adaptive recording application provides the user with a default screen 201 showing recording controls on the communication device. The adaptive recording application detects an activation of the interface element, for example, when the user clicks 202 or presses and holds an initiation button and releases the initiation button after a certain duration of time. The adaptive recording application initiates 203 recording of an audio message and measures the duration of activation or click of the interface element. The adaptive recording application then compares 204 the duration of the activation of the interface element with the critical time. If the duration of the activation of the interface element is greater than the critical time, the adaptive recording application selects the push to talk communication mode 205. If the duration of the activation of the interface element is less than the critical time, the adaptive recording application selects the tap to start communication mode 212. The adaptive recording application completes recording the audio message using one of the selected communication modes. After selection of the communication mode, the adaptive recording application provides an indication 206 to the user to start talking. As the user talks 207, the adaptive recording application detects an end of the recording when the user lets go off or releases 208 the initiation button or when the user stops talking 214 or taps a stop button 213, and triggers termination 209 of the recording. The adaptive recording application saves 210 the recorded audio message and provides an indication 211 to the user that the recorded audio message is saved. This embodiment eliminates the step of having to decide and manually switch between the communication modes while trying to record an audio message on a communication device, and allows the user to seamlessly use either of the communication modes for any utterance or audible sounds.

The computer implemented method disclosed herein allows the user to record and transmit voice messages to his/her friends, without worrying about the communication mode to use. The user can conveniently and seamlessly use either of the communication modes, for example, the push to talk communication mode or the tap to start communication mode, with the adaptive recording application performing the operation of deducing which communication mode is intended to be used by the user, and adapting the recording of the audio message automatically for that communication mode. Consider an example where the adaptive recording application configures the critical time to 100 milliseconds. If the user taps the interface element on the communication device for a time shorter than the critical time, the adaptive recording application deduces that the user intends to use the tap to start communication mode and invokes a tap to start screen on the communication device for prompting the user to start recording an audio message. The user may then record a lengthy audio message and then press a stop button on the communication device, which will save and send the user's audio message.

The user may then wish to invite his/her other friends to go to the movies, for example, by sending them a short 3 second audio message. The user would only need to press down on the initiation button and keep the initiation button pressed to record the short audio message. After the critical time passes and the user's finger is still on the initiation button, the adaptive recording application deduces that the user intends to use the push to talk communication mode, provides an indication that the push to talk communication mode is active, and sends an indication to the user to start recording the audio message. In order to terminate the recording, the user only needs to release the initiation button.

Different examples are disclosed below where a user activates an interface element, also referred to as a "button", and the adaptive recording application selects a communication mode for recording the audio message based on a combination of the comparison of the duration of the activation of the button with the critical time and the determination of a presence or an absence of an audio signal during and/or after the activation of the button. In an example, when the user presses a button on the communication device for a short duration of time less than the critical time and remains silent while pressing the button, the adaptive recording application selects the tap to start communication mode. In another example, when the user presses a button for a short duration of time less than the critical time, remains silent while pressing the button for some time after pressing the button, and then speaks, the adaptive recording application selects the tap to start communication mode. In another example, when the user presses a button for a short duration of time less than the critical time, and then speaks while pressing the button, the adaptive recording application still selects the tap to start communication mode.

In another example, when the user presses a button for a long duration of time greater than the critical time and remains silent while pressing the button, the adaptive recording application selects the push to talk communication mode. In another example, when the user presses a button for a long duration of time greater than the critical time, remains silent while pressing the button and then speaks after releasing the button, the adaptive recording application selects the push to talk communication mode. In another example, when the user presses a button for a long duration of time greater than the critical time and speaks while pressing the button, the adaptive recording application still selects the push to talk communication mode.

Figure 3:
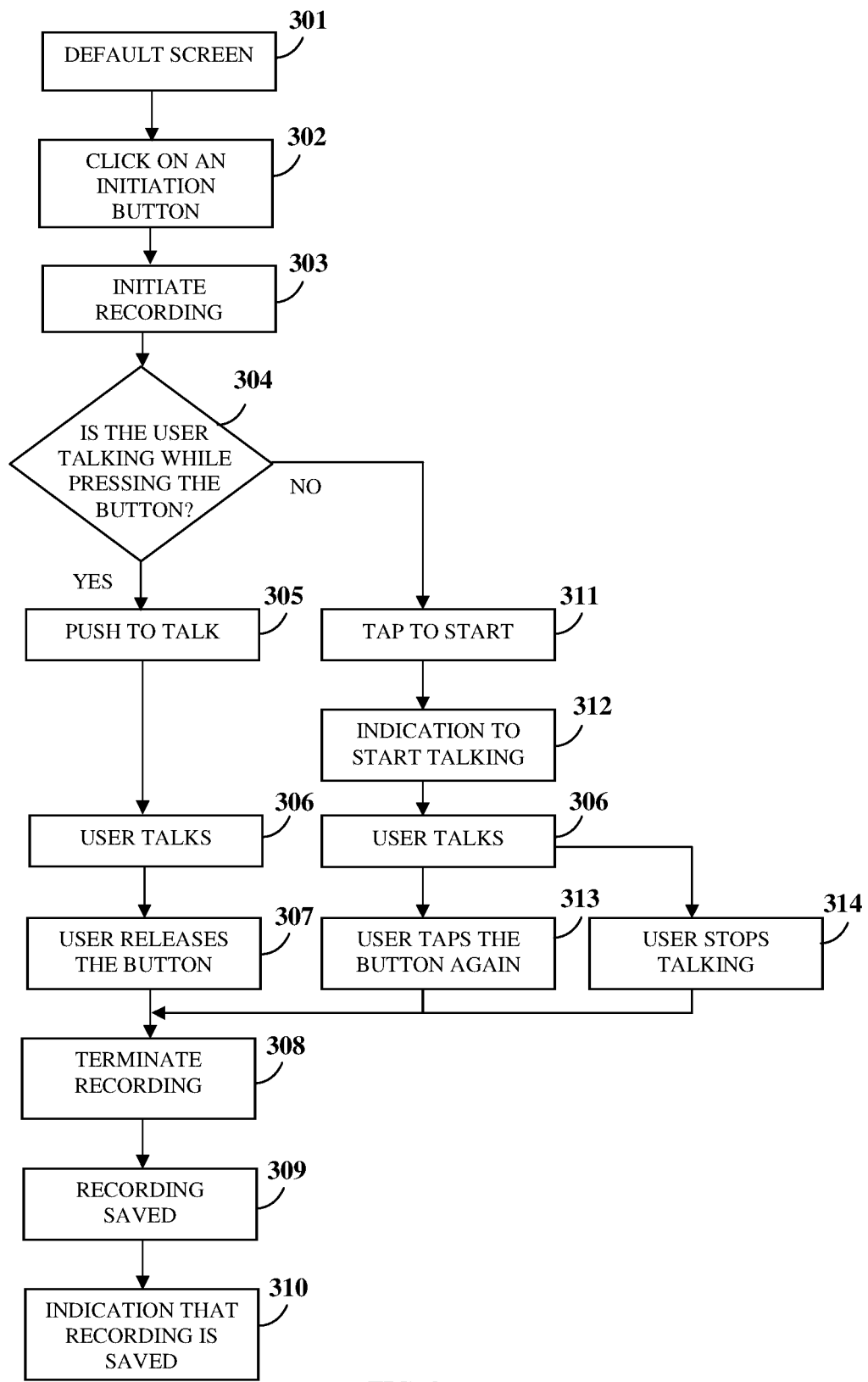
FIG. 3 exemplarily illustrates a flowchart comprising the steps for determining a communication mode for recording an audio message on a communication device based on a determination of a presence or an absence of an audio signal.

FIG. 3 exemplarily illustrates a flowchart comprising the steps for determining a communication mode for recording an audio message on a communication device based on a determination of a presence or an absence of an audio signal. In an example, the adaptive recording application detects activation of at least two interface elements, for example, a hardware or software implemented tactile interface element and an audio interface element. The audio interface element, for example, a microphone is capable of capturing an audio signal and providing the audio signal to the adaptive recording application. The tactile interface element is capable of capturing an application of pressure on the tactile interface element. The user may click on the tactile interface element to initiate recording of an audio message and activate the audio interface element to terminate the recording using a voice command.

The adaptive recording application provides the user with a default screen 301 showing recording controls on the communication device. The adaptive recording application detects an activation of the tactile interface element, for example, a click on an initiation button 302 on the user's communication device and initiates 303 recording of an audio message. The adaptive recording application then checks 304 whether the user is talking while pressing the initiation button by detecting presence or absence of an audio signal. If the adaptive recording application detects an activation of the tactile interface element and determines a presence of an audio signal, the adaptive recording application selects the push to talk communication mode 305 for recording the audio message. That is, if the user presses down on the initiation button and starts talking while the initiation button is pressed, the adaptive recording application recognizes that words are being spoken while the initiation button is pressed down, and deduces that the user intends to use the push to talk communication mode. As the user talks 306, the audio message is recorded in the push to talk communication mode on the communication device. After completing the audio message, the user lets go off or releases 307 the initiation button on the communication device, which triggers termination 308 of the recording. The adaptive recording application saves 309 the recorded audio message and provides an indication 310 to the user that the recorded audio message is saved.

If the adaptive recording application determines an absence of an audio signal during the activation of the tactile interface, the adaptive recording application selects the tap to start communication mode 311 for recording the audio message. That is, if there is a silence or a lack of audible sounds such as music, natural sounds such as birds chirping, etc., while the user is pressing the initiation button, the adaptive recording application deduces that the user intends to use the tap to start communication mode. After the user releases the finger from the initiation button, that is, when the user is no longer pressing the initiation button, the adaptive recording application provides an indication 312 to the user to start talking. As the user talks 306, the audio message is recorded in the tap to start communication mode on the communication device. When the user stops talking 314 or taps 313 a stop button, the adaptive recording application detects an end of the recording and triggers termination 308 of the recording. The adaptive recording application saves 309 the recorded audio message and provides an indication 310 to the user that the recorded audio message is saved. This embodiment eliminates problems a user may face on deciding and switching between the communication modes while recording an audio message on a portable communication device, and allows the user to seamlessly use either of the communication modes for any utterance or audible sounds. Furthermore, this embodiment provides more flexibility to the user by relying on voice activity detection rather than just the passage of time to determine what communication mode the user wants to use. The adaptive recording application performs voice activity detection, for example, using speech recognition algorithms of Nuance Communications Inc., at&t Inc., Google Inc., etc., and other techniques that are well known in the art.

Figure 4:
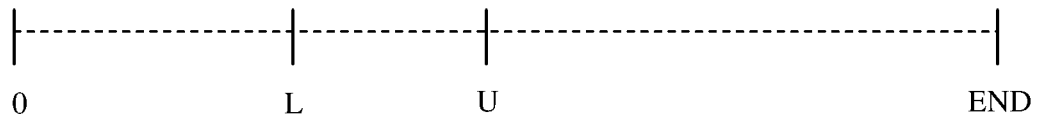
FIG. 4 exemplarily illustrates a timing diagram showing a lower threshold time and an upper threshold time configured for determining a communication mode for recording a media message on a communication device.

FIG. 4 exemplarily illustrates a timing diagram showing a lower threshold time (L) and an upper threshold time (U) configured for determining a communication mode for recording a media message on a communication device. In this embodiment, the configurable time parameters comprise the lower threshold time and the upper threshold time. As used herein, the term "lower threshold time" refers to a time before which it is explicitly clear that the user's intention is to use the tap to start communication mode based on the fact that the interface element is held down for a short time. Also, as used herein, the term "upper threshold time" refers to a time after which it is explicitly clear that the user intends to use the push to talk communication mode based on the fact that the user is holding the interface element down for a long time. The timing diagram exemplarily illustrated in FIG. 4 shows the lower threshold time being set to L seconds and the upper threshold time being set to U seconds. In this embodiment, the adaptive recording application compares the duration of the activation of the interface element with the lower threshold time and the upper threshold time as disclosed in the detailed description of FIGS. 7A-7C.

The adaptive recording application selects one of the communication modes, for example, the tap to start communication mode if the duration of the activation of the interface element is less than the lower threshold time, and the other communication mode, for example, the push to talk communication mode if the duration of the activation of the interface element is greater than the upper threshold time. For example, if the user clicks a button for less than the lower threshold time, L, the adaptive recording application determines the click to be a tap because of the extremely short duration of the click and the adaptive recording application then determines that the user is intending to use the tap to start communication mode. If the user clicks a button for a duration of time greater than the upper threshold time, U, the adaptive recording application interprets the button to be held for an extended duration of time and then determines that the user is intending to use the push to talk communication mode. If the user clicks on the button for a duration of time between the lower threshold time L and the upper threshold time U, the adaptive recording application determines the intent of the user using a hybrid method disclosed in the detailed description of FIGS. 7A-7C.

In an embodiment, if the duration of the activation of the interface element is greater than the lower threshold time and less than the upper threshold time, the adaptive recording application selects one of the communication modes based on one or more of multiple options comprising, for example, a presence or an absence of a media signal, proximity of the duration of the activation of the interface element to the lower threshold time or the upper threshold time, that is, which among the lower threshold time and the upper threshold time the tap or click length is closer to, type of the user's communication device, a user input clarifying the communication mode intended by the user, etc. The options comprise any method for selecting a communication mode. In an embodiment, the adaptive recording application provides a dialog box accessible on the user's communication device that prompts the user to select which communication mode he/she would like to use.

Figure 5:
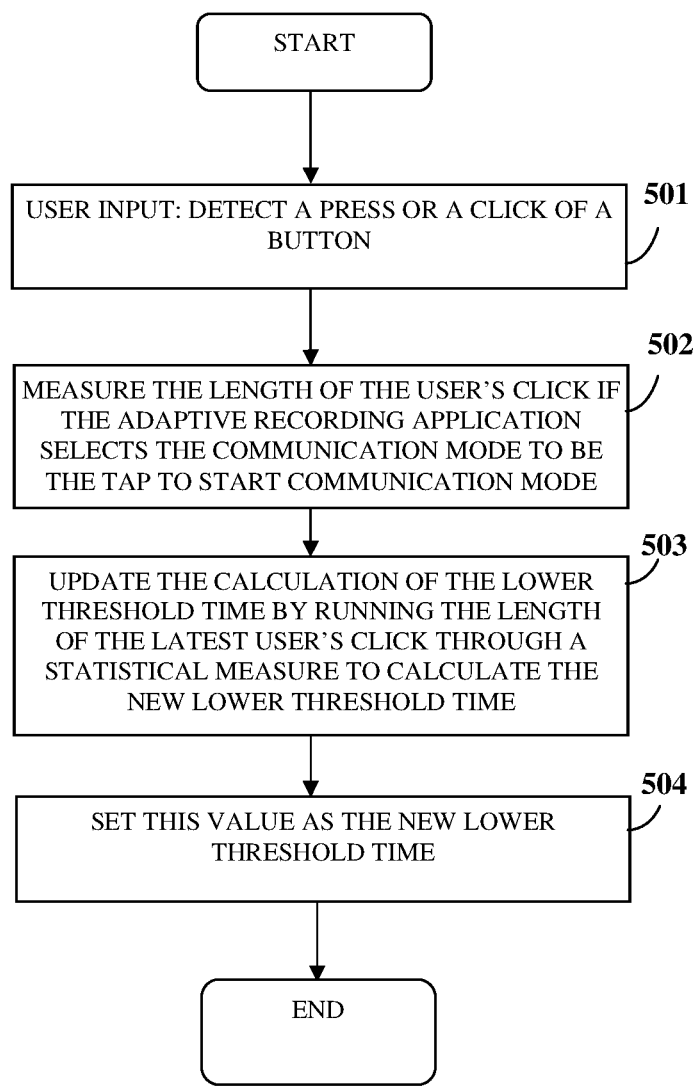
FIG. 5 exemplarily illustrates a flow diagram comprising the steps for configuring a lower threshold time for determining a communication mode for recording a media message on a communication device.

FIG. 5 exemplarily illustrates a flow diagram comprising the steps for configuring a lower threshold time for determining a communication mode for recording a media message on a communication device. Consider an example where the lower threshold time is configured at L seconds by a user input, a system setting, etc. The adaptive recording application detects activation of an interface element on the communication device. That is, the adaptive recording application detects 501 a press or a click of a button. After detection of the click of the button, the adaptive recording application measures 502 the length or duration of the user's click, if the adaptive recording application selects the communication mode to be the tap to start communication mode. The adaptive recording application then updates 503 the calculation of the lower threshold time by running the length of the latest user's click through a statistical measure to calculate the new lower threshold time. The adaptive recording application then sets 504 the updated value as the new lower threshold time.

Consider an example where the lower threshold time is denoted by LTT. Consider $t_1, t_2, \ldots, t_n$, to be the set containing the length of the activation of the interface element during each user's interactions in which the tap to start communication mode was selected to be used by the adaptive recording application on the communication device, where "$t_1$" corresponds to the user's first interaction and each subsequent interaction corresponds to the next element in the set. Consider $LTT_0$ to be the lower threshold time initially set at the start before the user has performed any click. $LTT_0$ is initialized, for example, using a system setting. Consider $LTT_n$ to be the lower threshold time after the user has performed "n" clicks in which the tap to start communication mode was selected to be used by the adaptive recording application on the communication device. $LTT_n$ may be calculated by any statistical measure from $LTT_0, t_1, \ldots, t_n$.

Enumerated below are examples of the statistical measures used for calculating $LTT_n$. In a first example, $LTT_n$ can be the average of all elements in the set containing the lengths of each of the user's clicks when the communication mode selected by the adaptive recording application is the tap to start communication mode, as shown below:

$LTT_n = \text{avg}(LTT_0, t_1, \ldots, t_n)$

In an second example, if "n" is greater than a number such as 5, $LTT_n$ can be the average of all elements in the set containing the lengths of each of the user's clicks when the communication mode selected by the adaptive recording application is the tap to start communication mode, excluding the set's maximum and minimum. In a third example, $LTT_n$ can be the maximum of all elements in the set containing the lengths of each of the user's clicks when the communication mode selected by the adaptive recording application is the tap to start communication mode, as shown below:

$LTT_n = \max(LTT_0, t_1, \ldots, t_n)$

In a fourth example, $LTT_n$ can be the minimum of all elements in the set containing the lengths of each of the user's clicks when the communication mode selected by the adaptive recording application is the tap to start communication mode, as shown below:

$LTT_n = \min(LTT_0, t_1, \ldots, t_n)$

Figure 6:
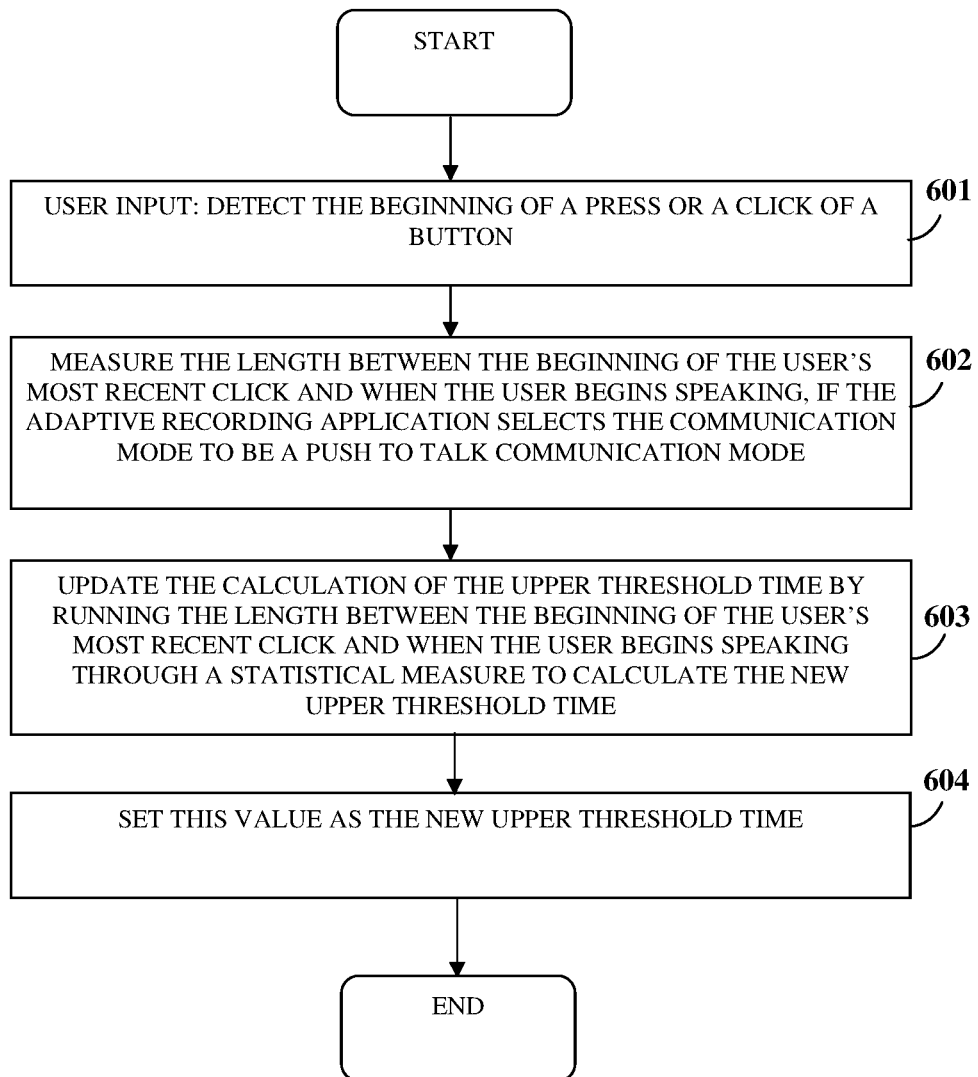
FIG. 6 exemplarily illustrates a flow diagram comprising the steps for configuring an upper threshold time for determining a communication mode for recording a media message on a communication device.

FIG. 6 exemplarily illustrates a flow diagram comprising the steps for configuring an upper threshold time for determining a communication mode for recording a media message on a communication device. Consider an example where the upper threshold time is configured at U seconds by a user input, a system setting, etc. The adaptive recording application detects activation of an interface element on the communication device. That is, the adaptive recording application detects 601 the beginning of a press or click of a button. After detection of the beginning of the activation of interface element, the adaptive recording application measures 602 the length of time between the beginning of the user's most recent click and when the user begins speaking, for the case when the adaptive recording application selects the communication mode to be the push to talk communication mode. The adaptive recording application then updates 603 the calculation of the upper threshold time by running the length between the beginning of the user's most recent click and when the user begins speaking through a statistical measure to calculate the new upper threshold time. The adaptive recording application then sets 604 the updated value as the new upper threshold time.

Consider an example where the upper threshold time is denoted by UTT. Consider $t_1, t_2, \ldots, t_n$, to be the set containing the lengths between the beginning of the activation of the interface and when the user first starts speaking, for the cases when the push to talk communication mode is selected by the adaptive recording application, where "$t_1$" corresponds to the user's first interaction and each subsequent interaction corresponds to the next element in the set. Consider $UTT_0$ to be the upper threshold time initially set at the start before the user has performed any click. $UTT_0$ is initialized, for example, using a system setting. Consider $UTT_n$ to be the upper threshold time after the user has performed "n" interactions in which the push to talk communication mode was selected to be used by the adaptive recording application. $UTT_n$ may be calculated by any statistical measure from $UTT_0, t_1, \ldots, t_n$.

Enumerated below are examples of the statistical measures used for calculating $UTT_n$. In a first example, $UTT_n$ can be the average of all elements in the set, as shown below:

$UTT_n = \text{avg}(LTT_0, t_1, \ldots, t_n)$

In a second example, if "n" is greater than a number such as 5, $UTT_n$ can be the average of all elements in the set, excluding the set's maximum and minimum. In a third example, $UTT_n$ can the maximum of all elements in the set, as shown below:

$UTT_n = \max(LTT_0, t_1, \ldots, t_n)$

In a fourth example, $UTT_n$ can be the minimum of all elements in the set, as shown below:

$UTT_n = \min(LTT_0, t_1, \ldots, t_n)$

In an embodiment, the adaptive recording application engages the user in a training session for adaptively configuring the lower threshold time and the upper threshold time for determining a communication mode for recording a media message on a communication device. The configuration of the lower threshold time and the upper threshold time is customized based on how the user selects the communication modes. The adaptive recording application instructs the user to repeatedly press and release the interface element while intending to use the push to talk communication mode. The adaptive recording application then instructs the user to repeatedly press and release the interface element while intending to use the tap to start communication mode. The adaptive recording application then sets the lower threshold time and the upper threshold time based on an average formula or another statistical measure. For example, during the training session of the push to talk communication mode if the user required 1.0 second to press and release the interface element for the first trial, 1.0 second to press and release the interface element for the second trial, and 2.0 seconds to press and release the interface element for the third trial, then the adaptive recording application sets the upper threshold time to 1.33 seconds. In another example, during the training session of the tap to start communication mode if the user required 0.5 seconds to press and release the interface element for the first trial, 0.5 seconds to press and release the interface element for the second trial, and 0.3 seconds to press and release the interface element for the third trial, then the adaptive recording application sets the lower threshold time to 0.43 seconds.

In another embodiment, the lower threshold time and the upper threshold time can be used to calculate the critical time that is used to select the communication mode for recording a media message, for example, an audio message disclosed in the detailed description of FIG. 2. In this embodiment, the critical time is a time that falls between the upper threshold time and the lower threshold time. For example, the critical time can be the average of the upper threshold time and the lower threshold time. In another example, the critical time can be the third quartile or the fourth decile of the upper threshold time and the lower threshold time. In an embodiment, the upper threshold time and the lower threshold time can be directly used by a hybrid method as disclosed in the detailed description of FIGS. 7A-7C, for determining the communication mode for initiating recording of a media message.

Figure 7A:
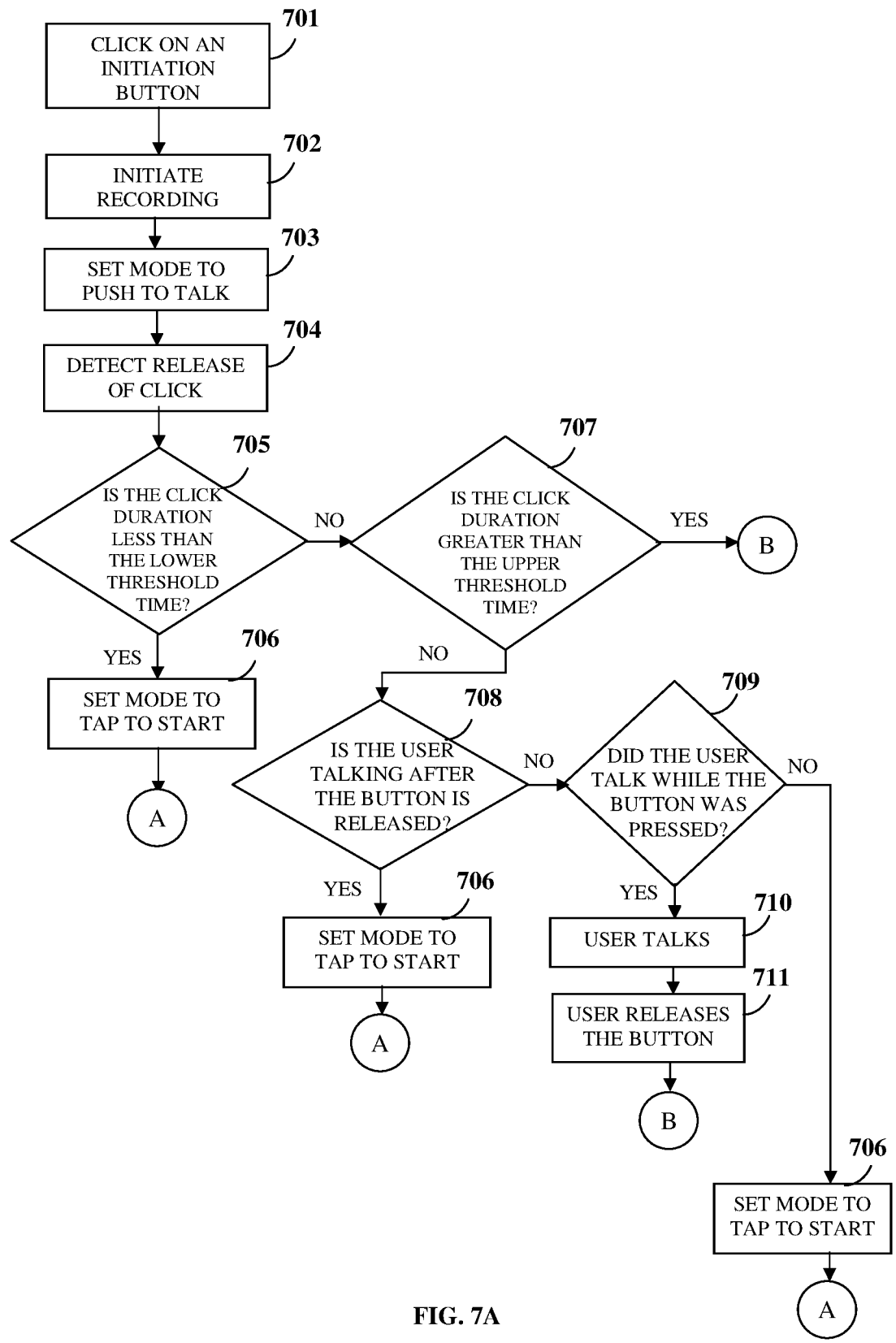
FIGS. 7A-7C exemplarily illustrate a flowchart comprising the steps for determining a communication mode based on a comparison of the duration of the activation of the interface element with a lower threshold time and an upper threshold time.
Figure 7B:
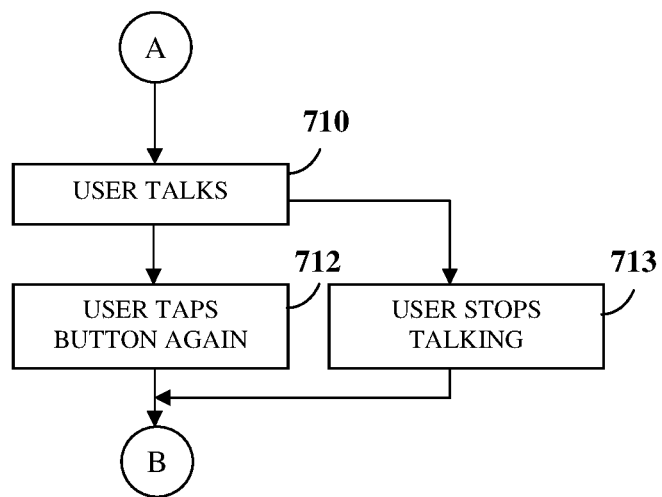
Figure 7C:
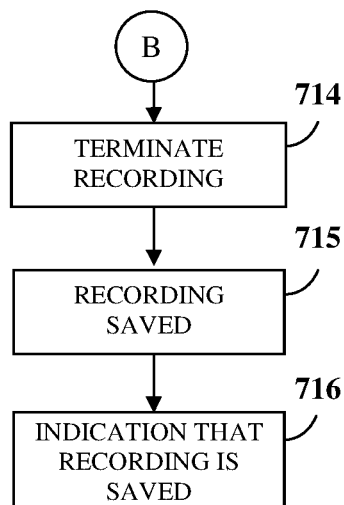

FIGS. 7A-7C exemplarily illustrate a flowchart comprising the steps for determining a communication mode based on a comparison of the duration of the activation of the interface element with a lower threshold time and an upper threshold time. The adaptive recording application provides the user with a default screen showing recording controls on the communication device. The adaptive recording application detects an activation of the interface element, for example, a click 701 on an initiation button on the user's communication device. The adaptive recording application initiates 702 recording of an audio message and sets 703 the communication mode to the push to talk communication mode so that any audio message starts recording. The adaptive recording application then detects 704 a release of a click on the initiation button. The adaptive recording application compares the duration of the click with the lower threshold time and the upper threshold time. For example, the adaptive recording application checks 705 if the duration of the click is less than the lower threshold time. If the duration of the click is less than the lower threshold time, the adaptive recording application sets 706 the communication mode to the tap to start communication mode for recording the audio message. As the user talks 710, the adaptive recording application detects an end of the recording when the user stops talking 713 or taps 712 a stop button exemplarily illustrated in FIG. 7B, and triggers termination 714 of the recording. The adaptive recording application saves 715 the recorded audio message and provides an indication 716 to the user that the recorded audio message is saved as exemplarily illustrated in FIG. 7C.

If the duration of the click is not less than the lower threshold, the adaptive recording application checks 707 whether the duration of the click is greater than the upper threshold time. If the duration of the click is greater than the upper threshold time, the adaptive recording application continues to record the audio, until the user releases the initiation button, at which time the adaptive recording application triggers termination 714 of the recording. The adaptive recording application saves 715 the recorded audio message and provides an indication 716 to the user that the recorded audio message is saved. If the duration of the click is less than the upper threshold time and greater than the lower threshold time, then the adaptive recording application checks 708 whether the user is talking after the initiation button is released. If the user is talking after the initiation button is released, the adaptive recording application sets 706 the communication mode to the tap to start communication mode. The user talks 710 and the adaptive recording application detects an end of the recording when the user stops talking 713 or taps 712 a stop button, and triggers termination 714 of the recording. The adaptive recording application saves 715 the recorded audio message and provides an indication 716 to the user that the recorded audio message is saved. If the user is not talking after the initiation button is released, then the adaptive recording application checks 709 whether the user was talking while the initiation button was pressed. If the user was talking while the button was pressed, then the adaptive recording application continues in the push to talk communication mode. The user talks 710 and releases the initiation button 711 to trigger the termination 714 of the recording. The adaptive recording application saves 715 the recorded audio message and provides an indication 716 to the user that the recorded audio message is saved. If the user is not talking during the time the initiation button was pressed, the adaptive recording application sets 706 the communication mode to the tap to start communication mode. The user talks 710 and the adaptive recording application detects an end of the recording when the user stops talking 713 or taps 712 a stop button, and triggers termination 714 of the recording. The adaptive recording application saves 715 the recorded audio message and provides an indication 716 to the user that the recorded audio message is saved.

Consider an example, where a lower threshold time is set to 0.2 seconds and an upper threshold time is set to 0.4 seconds. In the hybrid method, for a click time less than 0.2 seconds, the adaptive recording application determines the user's click to be a tap because of the short duration of the click and determines that the user is intending to use the tap to start communication mode. For a click time greater than 0.4 seconds, the adaptive recording application determines that the user is holding the button down for an extended duration of time and therefore intends to use the push to talk communication mode. When a user keeps a button pressed for a time between 0.2 seconds and 0.4 seconds, since the intent of the user may be unclear, the adaptive recording application checks whether the user is talking or not after the release of the button. If the user is talking after the release of the button, the adaptive recording application determines that the user wishes to continue talking and sets the communication mode to the tap to start communication mode. If the user is not talking when the button is released, then the adaptive recording application checks the recording during the click duration to determine the communication mode. If the user was talking during the click duration, then the adaptive recording application continues with the push to talk communication mode. If the user was not talking during the click duration, then the adaptive recording application sets the communication mode to the tap to start communication mode.

Figure 8:
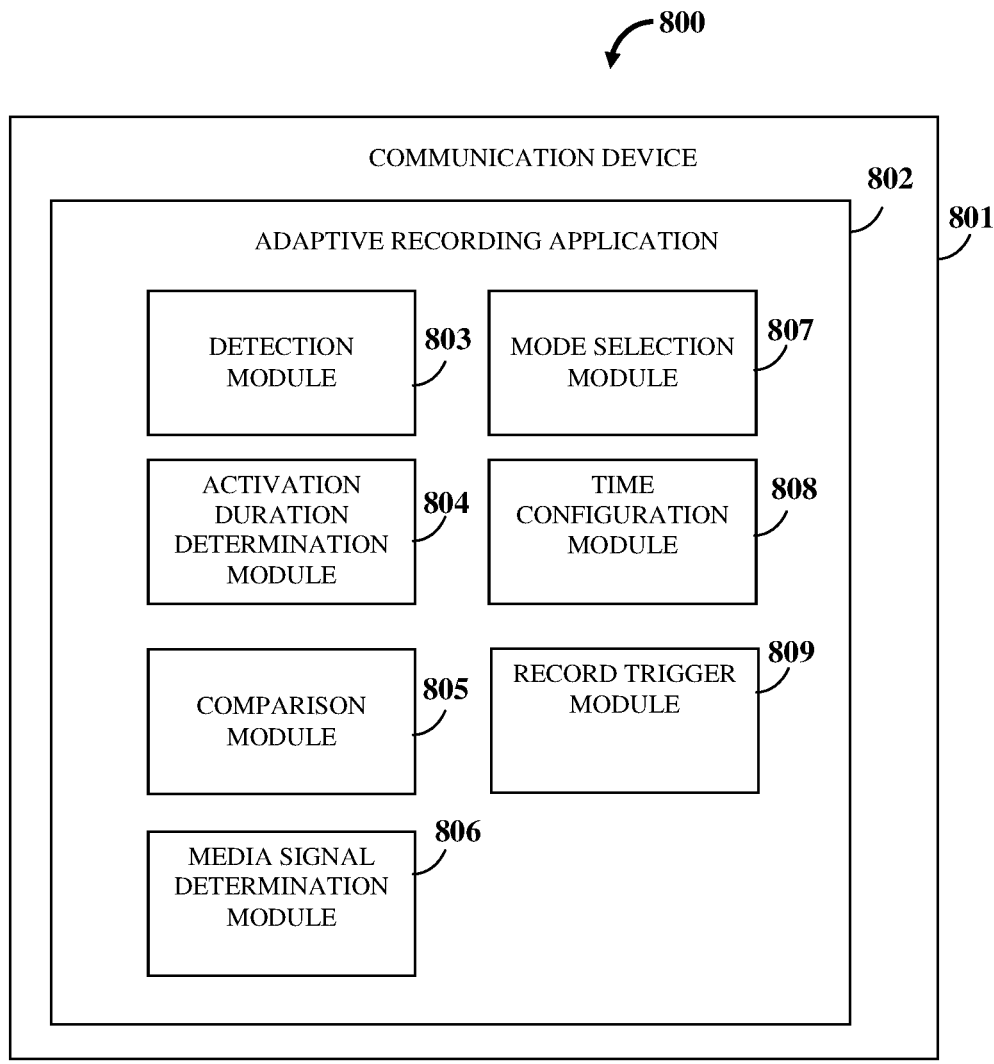
FIG. 8 exemplarily illustrates a computer implemented system for determining a communication mode for recording a media message on a communication device.

FIG. 8 exemplarily illustrates a computer implemented system 800 for determining a communication mode for recording a media message on a communication device 801. The communication mode is, for example, a push to talk communication mode, a tap to start communication mode, etc. The communication device 801 is, for example, a cellular phone, a smart phone, a tablet computing device, a laptop, etc., or any other mobile device configured for mobile communication. The computer implemented system 800 disclosed herein comprises the adaptive recording application 802 deployed on a user's communication device 801. The computer implemented system 800 disclosed herein further comprises at least one processor configured to execute modules 803, 804, 805, 806, 807, 808, 809, etc., of the adaptive recording application 802, and a non-transitory computer readable storage medium configured to store the modules 803, 804, 805, 806, 807, 808, 809, etc., of the adaptive recording application 802. The non-transitory computer readable storage medium is communicatively coupled to the processor. The adaptive recording application 802 comprises a detection module 803, an activation duration determination module 804, a comparison module 805, a media signal determination module 806, a mode selection module 807, a time configuration module 808, and a record trigger module 809.

The detection module 803 detects activation of an interface element on the communication device 801 for initiating recording of the media message. The activation duration determination module 804 determines a duration of the activation of the interface element. The comparison module 805 compares the duration of the activation of the interface element with one or more configurable timing parameters, for example, a critical time, a lower threshold time, an upper threshold time, etc. In an embodiment, the comparison module 805 compares the duration of the activation of the interface element with the critical time. In another embodiment, the comparison module 805 compares the duration of the activation of the interface element with the lower threshold time and the upper threshold time. The mode selection module 807 selects, in response to the detection of the activation of the interface element, one of the communication modes for recording the media message based on one or a combination of the comparison of the duration of the activation of the interface element with the configurable timing parameters performed by the comparison module 805 and a determination of a presence or an absence of a media signal during and/or after the activation of the interface element performed by the media signal determination module 806. In an embodiment, the mode selection module 807 selects one of the communication modes, for example, the tap to start communication mode, if the duration of the activation of the interface element is less than the critical time, and another of the communication modes, for example, the push to talk communication mode if the duration of the activation of the interface element is greater than the critical time. In another embodiment, the mode selection module 807 selects one of the communication modes, for example, the tap to start communication mode if the duration of the activation of the interface element is less than the lower threshold time, and another of the communication modes, for example, the push to talk communication mode if the duration of the activation of the interface element is greater than the upper threshold time. In another embodiment, the mode selection module 807 selects one of the communication modes based on one or more of multiple options, if the duration of activation of the interface element is greater than the lower threshold time and less than the upper threshold time. The options comprise, for example, the presence or the absence of a media signal, proximity of the duration of activation of the interface element to the lower threshold time or the upper threshold time, type of the communication device 801, a user input clarifying the communication mode intended by the user, etc.

The time configuration module 808 configures the configurable timing parameters, for example, based on a user input, a system setting configured by the adaptive recording application 802, an analysis of the duration of the activation of the interface element, and/or past user behavior determined from prior activations of the interface element by the user in the past, or during a training session. The media signal determination module 806 determines the presence or the absence of the media signal during and/or after the activation of the interface element. Furthermore, the media signal determination module 806 analyzes the media signal received during and/or after the activation of the interface element for selection of one of the communication modes. The record trigger module 809 triggers the recording of the media message using the selected communication mode.

Figure 9:
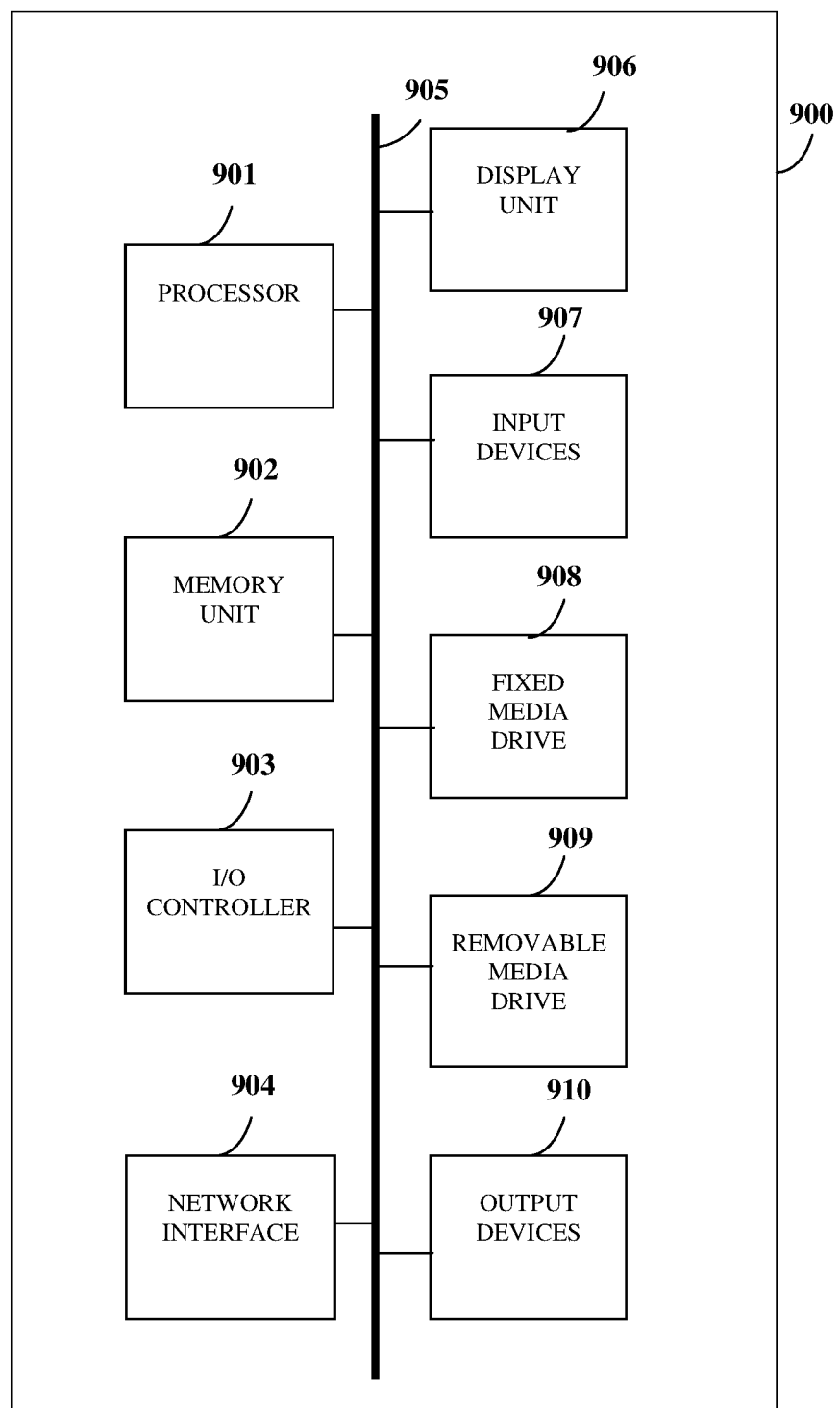
FIG. 9 exemplarily illustrates the architecture of a computer system employed by an adaptive recording application for determining a communication mode for recording a media message on a communication device.

FIG. 9 exemplarily illustrates the architecture of a computer system 900 employed by the adaptive recording application 802 for determining a communication mode for recording a media message on a communication device 801. The adaptive recording application 802 of the computer implemented system 800 exemplarily illustrated in FIG. 8 employs the architecture of the computer system 900 exemplarily illustrated in FIG. 9. The computer system 900 is programmable using a high level computer programming language. The computer system 900 may be implemented using programmed and purposeful hardware. The computer system 900 comprises, for example, a processor 901, a memory unit 902 for storing programs and data, an input/output (I/O) controller 903, a network interface 904, a data bus 905, a display unit 906, input devices 907, a fixed media drive 908, a removable media drive 909 for receiving removable media, output devices 910, etc.

The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 901 may also be implemented as a processor set comprising, for example, a general purpose microprocessor and a math or graphics co-processor. The processor 901 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The computer implemented system 800 disclosed herein is not limited to the computer system 900 employing the processor 901. The computer system 900 may also employ a controller or a microcontroller.

The memory unit 902 is used for storing programs, applications, and data. For example, the detection module 803, the activation duration determination module 804, the comparison module 805, the media signal determination module 806, the mode selection module 807, the time configuration module 808, the record trigger module 809, etc., of the adaptive recording application 802 are stored in the memory unit 902 of the computer system 900. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The computer system 900 further comprises a read only memory (ROM) or another type of static storage device that stores static information and instructions for the processor 901.

The I/O controller 903 controls input actions and output actions performed by the adaptive recording application 802. The network interface 904 enables connection of the computer system 900 to a network, for example, the internet, a mobile communication network, etc. For example, the computer system 900 communicates with other interacting devices, for example, another mobile device (not shown), through the network interface 904. In an embodiment, the network interface 904 is provided as an interface card also referred to as a line card. The network interface 904 comprises, for example, one or more of an infrared (IR) interface, an interface implementing WiFi® of the Wireless Ethernet Compatibility Alliance, Inc., a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 905 permits communication between the modules, for example, 803, 804, 805, 806, 807, 808, 809, etc., of the adaptive recording application 802.

The display unit 906 via a graphical user interface (GUI), displays information, display interfaces, user interface elements such as text fields, checkboxes, text boxes, windows, etc., for allowing the user, for example, to record and send a media message. The display unit 906 comprises, for example, a liquid crystal display, a plasma display, an organic light emitting diode (OLED) based display, etc. The input devices 907 are used for inputting data, for example, a media message, into the computer system 900. The input devices 907 are, for example, a microphone for inputting voice, a physical button, a touch pad, a touch sensitive display device or any device capable of sensing a tactile input, etc. The input devices 907 further comprise a keyboard such as an alphanumeric keyboard for entering a text message, a joystick, a pointing device such as a computer mouse, a light pen, a pointing device, a track ball, a pointing stick, etc.

Computer applications and programs are used for operating the computer system 900. The programs are loaded onto the fixed media drive 908 and into the memory unit 902 of the computer system 900 via the removable media drive 909. In an embodiment, the computer applications and programs may be loaded directly via a network, for example, a Wi-Fi® network. Computer applications and programs are executed by double clicking a related icon displayed on the display unit 906 using one of the input devices 907. The output devices 910 output the results of the operations performed by the adaptive recording application 802, for example, for viewing by a user of the communication device 801. For example, the adaptive recording application 802 notifies a user of a selected communication mode, about the recorded media message generated on successful recording of the media message, etc., through a pop-up window on the output device 910 such as the display unit 906 of the communication device 801. In another example, the adaptive recording application 802 prompts the user to select which communication mode he/she would like to use through a dialog box on the output device 910 such as the display unit 906 of the communication device 801.

The processor 901 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, Windows Phone™ operating system of Microsoft Corporation, BlackBerry® operating system of Research in Motion Limited, the iOS operating system of Apple Inc., the Symbian® operating system of Symbian Foundation Limited, etc. The computer system 900 employs an operating system for performing multiple tasks. The operating system is responsible for management and coordination of activities and sharing of resources of the computer system 900. The operating system further manages security of the computer system 900, peripheral devices connected to the computer system 900, and network connections. The operating system employed on the computer system 900 recognizes, for example, inputs provided by a user using one of the input devices 907, the output display, files, and directories stored locally on the fixed media drive 908, for example, a hard drive. The operating system on the computer system 900 executes different programs using the processor 901. The processor 901 and the operating system together define a computer platform for which application programs in high level programming languages are written.

The processor 901 retrieves the instructions for executing the modules, for example, 803, 804, 805, 806, 807, 808, 809, etc., of the adaptive recording application 802. A program counter determines the location of the instructions in the memory unit 902. The program counter stores a number that identifies a current position in the program of each of the modules, for example, 803, 804, 805, 806, 807, 808, 809, etc., of the adaptive recording application 802. The instructions fetched by the processor 901 from the memory unit 902 after being processed are decoded. The instructions are stored in an instruction register in the processor 901. After processing and decoding, the processor 901 executes the instructions. For example, the detection module 803 defines instructions for detecting activation of an interface element on the communication device 801 for initiating recording of a media message. The activation duration determination module 804 defines instructions for determining a duration of the activation of the interface element. The time configuration module 808 defines instructions for configuring the configurable timing parameters, for example, based on a user input, a system setting configured by the adaptive recording application 802, an analysis of the duration of the activation of the interface element, and/or past user behavior determined from prior activations of the interface element by the user in the past, or during a training session. The comparison module 805 defines instructions for comparing the duration of the activation of the interface element with one or more configurable timing parameters, for example, a critical time, a lower threshold time, an upper threshold time, etc. In an embodiment, the comparison module 805 defines instructions for comparing the duration of the activation of the interface element with the critical time. In another embodiment, the comparison module 805 defines instructions for comparing the duration of the activation of the interface element with the lower threshold time and the upper threshold time.

The media signal determination module 806 defines instructions for determining the presence or the absence of a media signal during and/or after the activation of the interface element. In an embodiment, the media signal determination module 806 defines instructions for analyzing the media signal received during and/or after the activation of the interface element for the selection of one of the communication modes. The record trigger module 809 defines instructions for triggering the recording of the media message using the selected communication mode. The mode selection module 807 defines instructions for selecting, in response to the detection of the activation of the interface element on the communication device 801, one of multiple communication modes for recording the media message based on one or a combination of the comparison of the duration of the activation of the interface element with one or more configurable timing parameters and the determination of a presence or an absence of a media signal during and/or after the activation of the interface element.

In an embodiment, the mode selection module 807 defines instructions for selecting one of the communication modes, for example, the tap to start communication mode, if the duration of the activation of the interface element is less than the critical time, and another of the communication modes, for example, the push to talk communication mode if the duration of the activation of the interface element is greater than the critical time. In another embodiment, the mode selection module 807 defines instructions for selecting one of the communication modes, for example, the tap to start communication mode, if the duration of the activation of the interface element is less than the lower threshold time, and another of the communication modes, for example, the push to talk communication mode if the duration of the activation of the interface element is greater than the upper threshold time. In another embodiment, the mode selection module 807 defines instructions for selecting one of the communication modes based on one or more options comprising, for example, the presence or the absence of the media signal, proximity of the duration of activation of the interface element to the lower threshold time or the upper threshold time, type of the communication device 801, a user input clarifying the communication mode intended by the user, etc., if the duration of activation of the interface element is greater than the lower threshold time and less than the upper threshold time.

The processor 901 of the computer system 900 employed by the adaptive recording application 802 retrieves the instructions defined by the detection module 803, the activation duration determination module 804, the comparison module 805, the media signal determination module 806, the mode selection module 807, the time configuration module 808, the record trigger module 809, etc., of the adaptive recording application 802 and executes the instructions, thereby performing one or more processes defined by those instructions.

At the time of execution, the instructions stored in the instruction register are examined to determine the operations to be performed. The processor 901 then performs the specified operations. The operations comprise arithmetic operations and logic operations. The operating system performs multiple routines for performing a number of tasks required to assign the input devices 907, the output devices 910, and memory for execution of the modules, for example, 803, 804, 805, 806, 807, 808, 809, etc., of the adaptive recording application 802. The tasks performed by the operating system comprise, for example, assigning memory to the modules, for example, 803, 804, 805, 806, 807, 808, 809, etc., of the adaptive recording application 802, and to data used by the adaptive recording application 802, moving data between the memory unit 902 and disk units, and handling input/output operations. The operating system performs the tasks on request by the operations and after performing the tasks, the operating system transfers the execution control back to the processor 901. The processor 901 continues the execution to obtain one or more outputs. The outputs of the execution of the modules, for example, 803, 804, 805, 806, 807, 808, 809, etc., of the adaptive recording application 802 are displayed to the user on the display unit 906.

For purposes of illustration, the detailed description refers to the adaptive recording application 802 disclosed herein being run locally on the computer system 900; however the scope of the computer implemented method and system 800 disclosed herein is not limited to the adaptive recording application 802 being run locally on the computer system 900 via the operating system and the processor 901, but may be extended to run remotely over the network, for example, by employing a web browser and a remote server, a mobile phone, or other electronic devices. One or more portions of the computer system 900 may be distributed across one or more computer systems (not shown) coupled to the network.

Disclosed herein is also a computer program product comprising a non-transitory computer readable storage medium that stores computer program codes comprising instructions executable by at least one processor 901 of the computer system 900 for determining a communication mode for recording a media message on a communication device 801. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 901, except for a transitory, propagating signal.

The computer program product disclosed herein comprises multiple computer program codes for determining a communication mode for recording a media message on a user's communication device 801. For example, the computer program product disclosed herein comprises a first computer program code for detecting activation of an interface element on the communication device 801 for initiating the recording of the media message; a second computer program code for determining a duration of the activation of the interface element; a third computer program code for comparing the duration of the activation of the interface element with one or more configurable timing parameters; and a fourth computer program code for selecting, in response to the detection of the activation of the interface element, one of multiple communication modes for recording the media message based on one or a combination of the comparison of the duration of the activation of the interface element with one or more configurable timing parameters and the determination of a presence or an absence of a media signal during and/or after the activation of the interface element.

The computer program product disclosed herein further comprises a fifth computer program code for configuring the configurable timing parameters, for example, based on a user input, a system setting configured by the adaptive recording application 802, an analysis of the duration of the activation of the interface element, and/or past user behavior determined from the activation of the interface element by the user in the past, or during a training session. The computer program product disclosed herein further comprises a sixth computer program code for analyzing the media signal received during and/or after the activation of the interface element for the selection of one of the communication modes. The computer program product disclosed herein further comprises one or more additional computer program codes for performing additional steps that may be required and contemplated for determining a communication mode for recording the media message on the communication device 801. In an embodiment, a single piece of computer program code comprising computer executable instructions performs one or more steps of the computer implemented method disclosed herein for determining a communication mode for recording the media message on the communication device 801.

The computer program codes comprising the computer executable instructions are embodied on the non-transitory computer readable storage medium. The processor 901 of the computer system 900 retrieves these computer executable instructions and executes them. When the computer executable instructions are executed by the processor 901, the computer executable instructions cause the processor 901 to perform the steps of the computer implemented method for determining a communication mode for recording the media message on the communication device 801.

It will be readily apparent that the various methods, algorithms, and computer programs disclosed herein may be implemented on computer readable media appropriately programmed for general purpose computers, computing devices, and communication devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, Fortran, Ruby, Pascal, Perl®, Python®, Visual Basic®, MATLAB®, etc. Other object-oriented, functional, scripting, and/or logical programming languages may also be used. The computer program codes or software programs may be stored on or in one or more mediums as object code. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices may comprise processors, for example, the Intel® processors, Advanced Micro Devices (AMD®) processors, Ultra-SPARC® processors, Hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the devices executes an operating system, for example, the Linux® operating system, the Unix® operating system, any version of the Microsoft® Windows® operating system, the Mac OS of Apple Inc., the IBM® OS/2, the Palm OS®, the Android® OS, the Blackberry® OS, the Solaris operating system developed by Sun Microsystems, Inc., or any other operating system. Handheld devices execute operating systems, for example, the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers. The present invention is not limited to a particular computer system platform, processor, operating system, or network.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for determining a communication mode, comprising:
    detecting activation of an interface element on a user communication device;
    measuring duration of said activation of said interface element;
    comparing said measured duration with a critical time;
    selecting a tap to start communication mode when said measured duration is less than or equal to said critical time;
    selecting a push to start communication mode when said measured duration is greater than said critical time; and
    providing an indication of said selected communication mode on said user communication device.

2. The computer implemented method of claim 1, wherein said critical time is set to distinguish between said tap on said interface element and said press and hold on said interface element.

3. The computer implemented method of claim 1, wherein said tap to start communication mode and said push to start communication mode is used to record a media message, and wherein said media message is one of an audio message, a video message, an audiovisual message, and a multimedia message.

4. The computer implemented method of claim 1, wherein said critical time is configured based on one of a user input, a system setting, an analysis of said duration of said activation of said interface element, and past user behavior determined from prior activations of said interface element.

5. A computer implemented system for determining a communication mode, comprising:
    a user communication device, comprising:
        at least one processor configured to execute an application;
        a non-transitory computer readable storage medium communicatively coupled to said at least one processor, said non-transitory computer readable storage medium configured to store said application;
        a display unit configured to display a recording interface comprising at least an interface element; and
        said application comprising:
            a detection module configured to detect user activation of said interface element on said display unit;
            an activation duration detection module configured to measure a duration of said user activation of said interface element;
            a comparison module configured to compare said measured duration with a critical time; and
            a mode selection module configured to select one of a tap to start communication mode when said measured duration is less than or equal to said critical time, and a push to start communication mode when said measured duration is greater than said critical time; and
        said application configured to provide an indication of said selected communication mode on said user communication device.

6. The computer implemented system of claim 5, wherein said critical time is set to distinguish between said tap on said interface element and said press and hold on said interface element.

7. The computer implemented system of claim 5, wherein said tap to start communication mode and said push to start communication mode is used to record a media message, and wherein said media message is one of an audio message, a video message, an audiovisual message, and a multimedia message.

8. The computer implemented system of claim 5, wherein a time configuration module of said application configures said critical time based on one of a user input, a system setting, an analysis of said duration of said activation of said interface element, and past user behavior determined from prior activations of said interface element.

* * * * *